(12) United States Patent
D'Souza et al.

(10) Patent No.: US 10,050,723 B2
(45) Date of Patent: Aug. 14, 2018

(54) IDENTITY AUTHENTICATION USING ACOUSTIC MEANS

(71) Applicant: Digital Kerosene Inc., Pasadena, CA (US)

(72) Inventors: Carey D'Souza, Pasadena, CA (US); John Neil Carter, Belle Harbour, NY (US); Jason Mullings, Whistler (CA)

(73) Assignee: Digital Kerosene Inc., Pasadena, CA (US)

( * ) Notice: Subject to any disclaimer, the term of this patent is extended or adjusted under 35 U.S.C. 154(b) by 0 days.

(21) Appl. No.: 15/179,887

(22) Filed: Jun. 10, 2016

(65) Prior Publication Data

US 2016/0365932 A1 Dec. 15, 2016

Related U.S. Application Data

(60) Provisional application No. 62/175,057, filed on Jun. 12, 2015.

(51) Int. Cl.
*H04B 11/00* (2006.01)
*H04W 12/06* (2009.01)

(52) U.S. Cl.
CPC ............ *H04B 11/00* (2013.01); *H04W 12/06* (2013.01)

(58) Field of Classification Search
CPC ............................... H04W 12/06; H04B 11/00
See application file for complete search history.

(56) References Cited

U.S. PATENT DOCUMENTS

| | | | | |
|---|---|---|---|---|
| 5,481,611 A | * | 1/1996 | Owens | .................. H04W 12/06 713/159 |
| 7,487,362 B2 | * | 2/2009 | Steenstra | ............. G06Q 20/341 713/182 |
| 8,214,645 B2 | * | 7/2012 | Brown | .................. H04L 63/061 713/171 |
| 2004/0221166 A1 | * | 11/2004 | Steenstra | ............. G06Q 20/341 713/182 |
| 2013/0050080 A1 | * | 2/2013 | Dahl | ........................ G01S 5/18 345/158 |
| 2014/0286517 A1 | | 9/2014 | Luna | |
| 2014/0376745 A1 | | 12/2014 | Cheung | |
| 2016/0365932 A1 | * | 12/2016 | Carter | .................... H04B 11/00 |

FOREIGN PATENT DOCUMENTS

| WO | WO 2016201419 A1 * | 12/2016 | ............. H04B 11/00 |
|---|---|---|---|
| WO | WO-2016201419 A1 * | 12/2016 | ............. H04B 11/00 |

OTHER PUBLICATIONS

International Search Report and Written Opinion for International Application PCT/US2016/037198, dated Sep. 20, 2016.
Filonenko et al., "Investigating Ultrasonic Positioning on Mobile Phones," 2010 International Conference on Indoor Positioning and Indoor Navigation (IPIN), Sep. 1, 2010.
Santagati et al., "U-Wear: Software-Defined Ultrasonic Networking for Wearable Devices," MobiSys 2015, May 2015.

* cited by examiner

*Primary Examiner* — Daniel Pihulic
(74) *Attorney, Agent, or Firm* — Baker Botts L.L.P.

(57) ABSTRACT

In particular embodiments, a method for transmitting authentication data using acoustical means, comprising: encoding, by a first device, information into an acoustic signal; emitting, by an audio output component of the first device, the acoustic signal; detecting, by an audio input component of a second device, the acoustic signal; and decoding, by the second device, the acoustic signal into one or more pieces of information.

15 Claims, 17 Drawing Sheets

US 10,050,723 B2

IDENTITY AUTHENTICATION USING ACOUSTIC MEANS

PRIORITY

This application claims the benefit, under 35 U.S.C. § 119(e), of U.S. Provisional Patent Application No. 62/175,057, filed 12 Jun. 2015, which is incorporated herein by reference.

TECHNICAL FIELD

This disclosure generally relates to acoustic data communication.

BACKGROUND

Conventional two-factor authentication relies on BLUETOOTH, WIFI, cellular networks (e.g., short message service, or SMS) or additional hardware to transmit authentication data. In most cases, these methods use a numeric or alphanumeric code that is input by the user or transmitted over 3G/wireless/BLUETOOTH technology, and the user is required to manually enter the code (e.g., a user-specified password) that is generated by these methods to complete the authentication process. This makes these methods vulnerable, unreliable, and cumbersome to use.

SUMMARY OF PARTICULAR EMBODIMENTS

In particular embodiments, a method may use acoustic frequencies to transmit data between a user's mobile device or wearable device and an online service or any other entity.

DESCRIPTION OF EXAMPLE EMBODIMENTS

Acoustic means comprises of ultrasonic, audible and hypersonic frequencies.

FIGS. 1A-4B are detailed diagrams of various devices communicating with each other using acoustic frequencies. Mobile/wearable device emits the acoustic sound from its speakers and the receiving device picks up this signal via its microphone and sends back a verification code acoustically. In particular embodiments, an identity authentication software uses acoustic patterns via a mobile/wearable device to authenticate a user's identity (e.g., in place of using email and/or username and password combinations). For example, the identity authentication software may be used for email, website, network, and device authentication. In particular embodiments, data may be exchanged using acoustic frequencies without the need for BLUETOOTH, wireless or network connectivity. In addition, the number of interactions required by the user during the authentication process may be reduced. The embodiments discussed herein may be used in other applications for mobile devices, personal computers, laptops, cellular phones, wearable devices, healthcare applications, IT applications, access control panels for ATMs, automobiles, and vending machines, and other suitable applications.

In particular embodiments, the surrounding ambient noise is filtered out using, for example, algorithms that identify the acoustic signal from the noise. In particular embodiments, the 20-22 kHz range may be used to minimize ambient noise.

Figure 1A:
FIGS. 1A and 1B are visual representations of acoustic or audible communications between a first computing device and a second computing device.
Figure 1B:
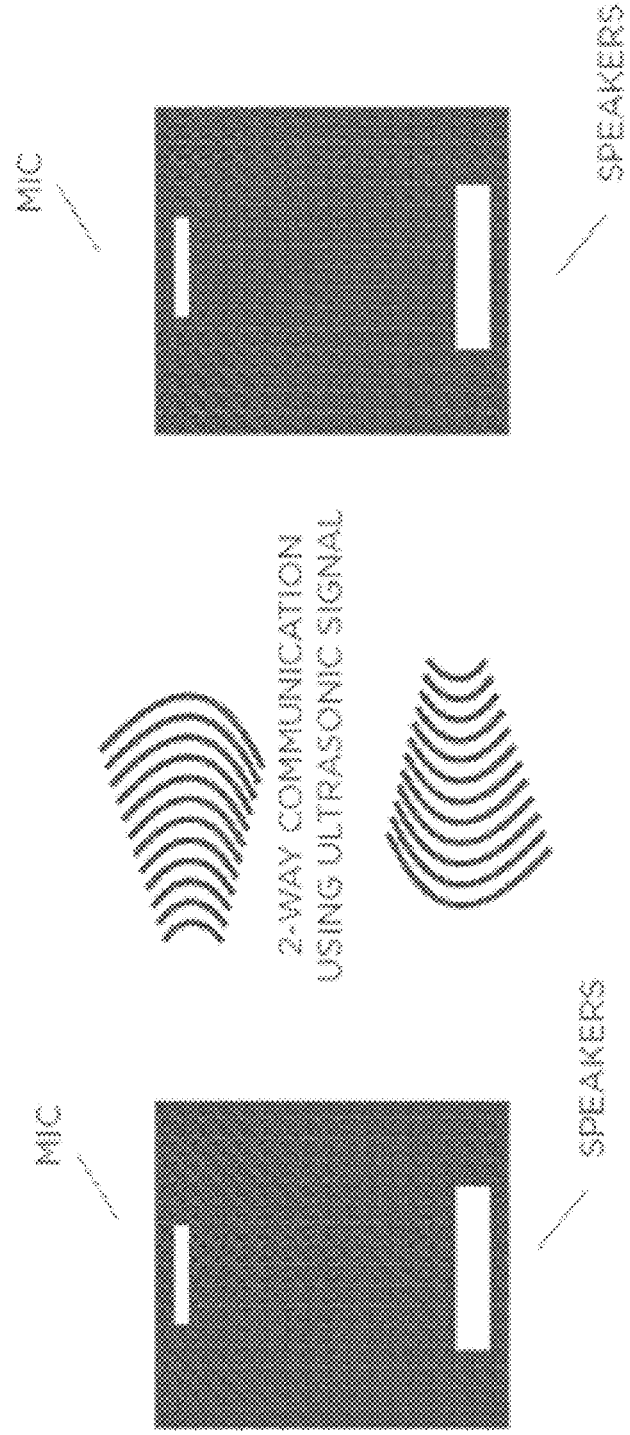

FIGS. 1A and 1B show example embodiments of acoustic communications between a first computing device and a second computing device. In FIG. 1A, a first computing device A may hold or generate data that can be used to access a protected resource on a second computing device B. First computing device A may encode the data and use it to modulate an acoustic signal that is transmitted from first computing device A's speaker. Second computing device B may comprise a decoder that is running software that is listening for a suitably encoded signal in a predefined acoustic frequency range. On detection of suitable data, the decoder of second computing device B may begin decoding the transmitted data until all required data has been decoded. At this point the software running on second computing device B is in possession of the data required to access the protected resource on second computing device B. In particular embodiments, the communication channel may be unidirectional.

FIG. 1B is essentially the same as FIG. 1A, except that it illustrates that a bi-directional acoustic communication channel may be created. Third computing device C may modulate an acoustic signal with the data required by fourth computing device D and transmit the signal using its speaker. Fourth computing device D may run software that is listening for properly formatted data in a given frequency range using its microphone. On detection of a properly formatted signal, fourth computing device D may decode and use the transmitted data. Fourth computing device D may use the same method to send data to third computing device C, which uses the same detection system to decode data. Steps are taken to allow third computing device C and fourth computing device D to each transmit and receive data at the same time.

Figure 2A:
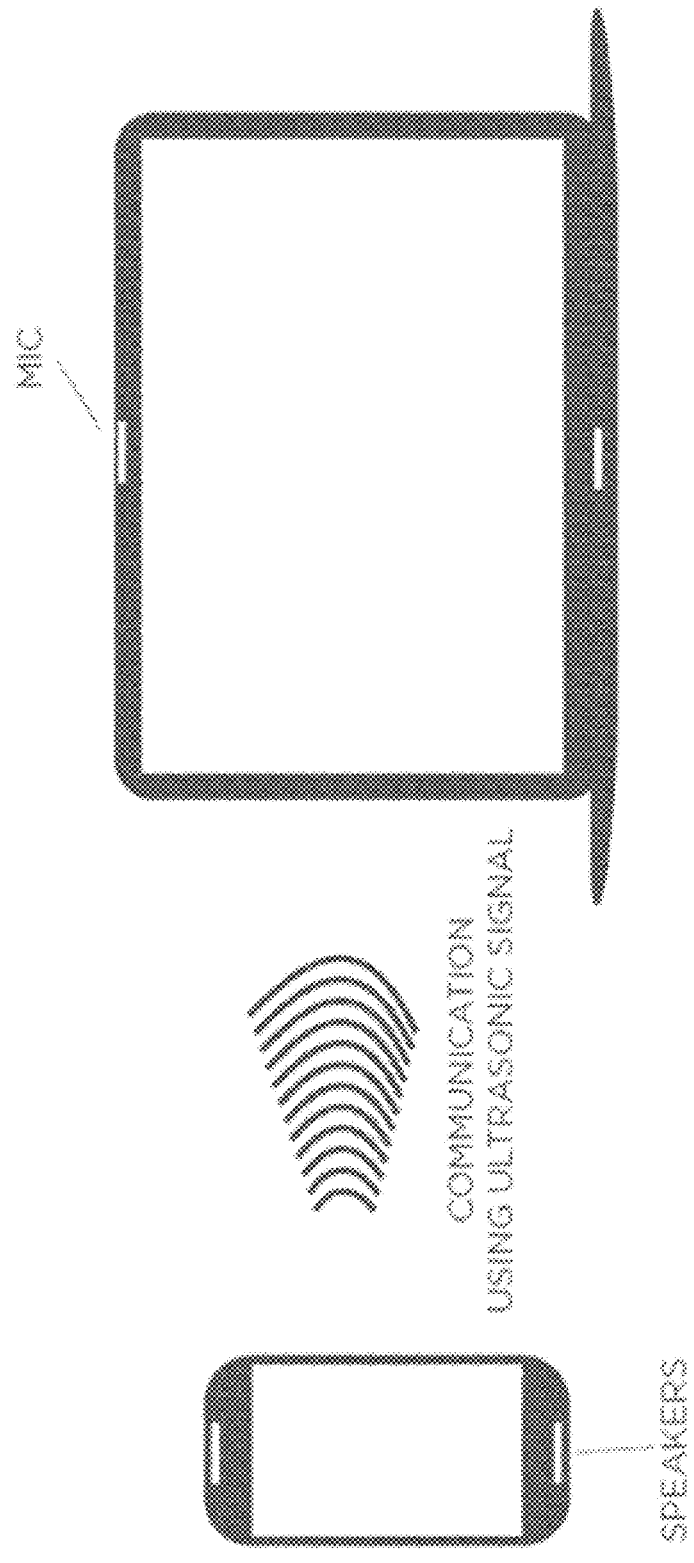
FIGS. 2A-2D are visual representations of acoustic or audible communications between a cellular phone/wearable device and a laptop.
Figure 2B:
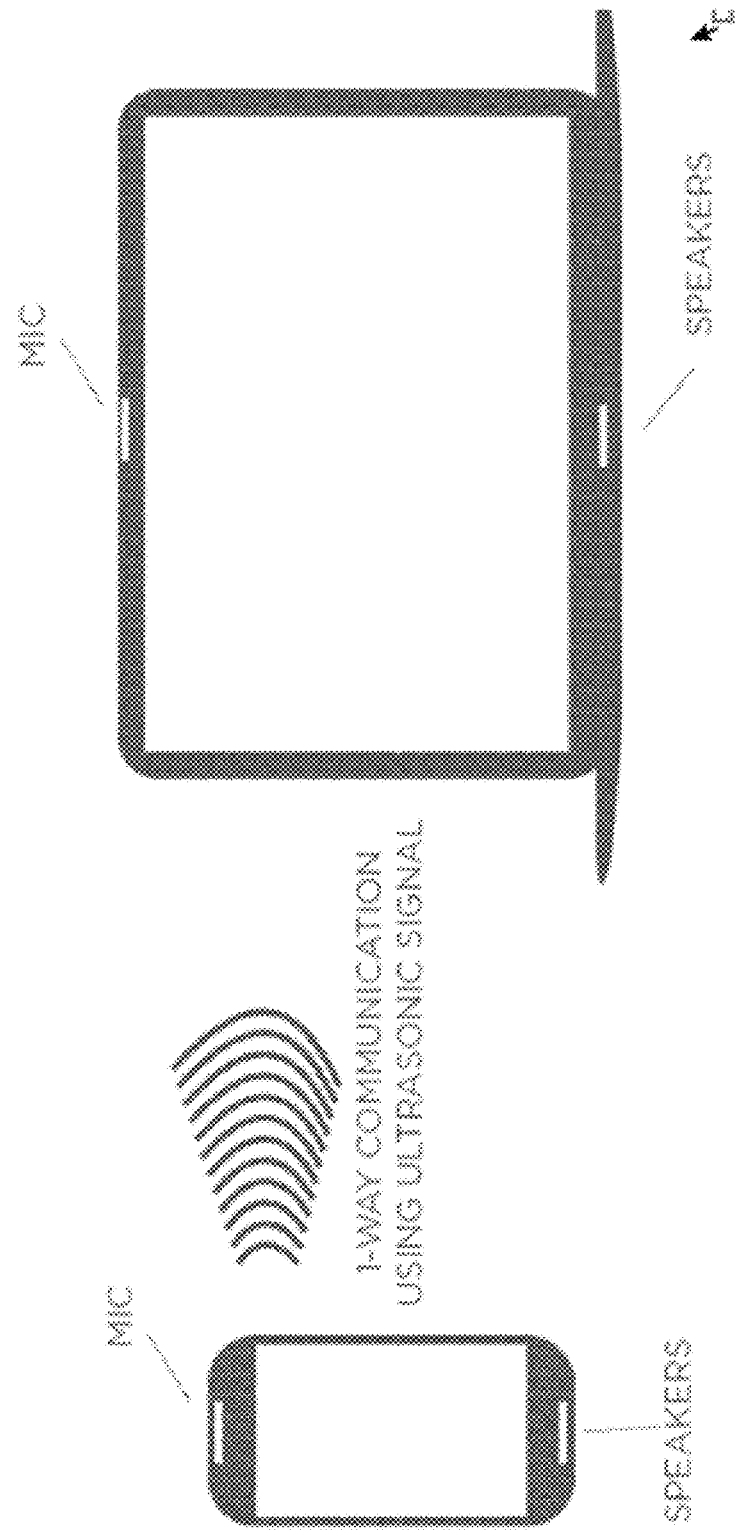
Figure 2C:
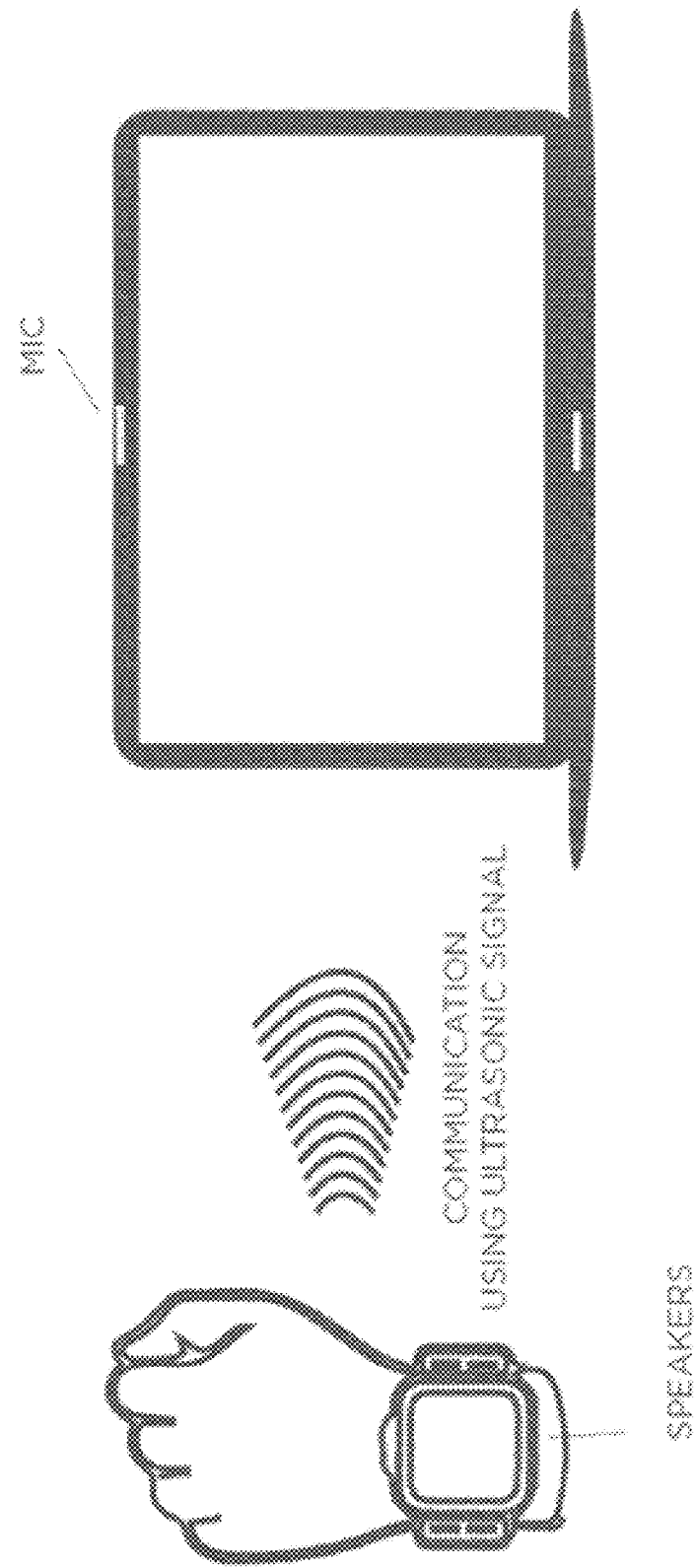
Figure 2D:
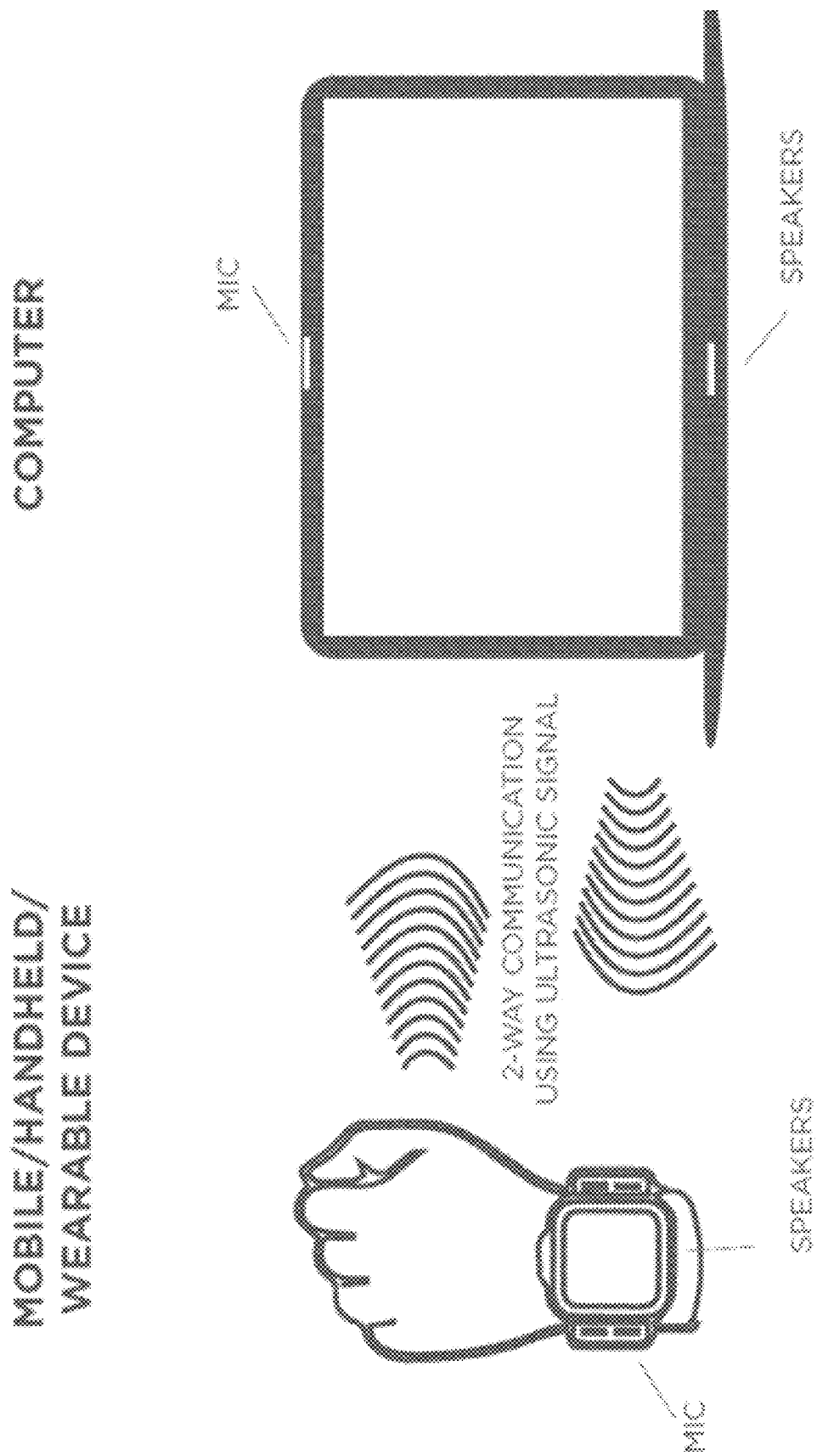

FIGS. 2A and 2B show example embodiments of acoustic communications between a cellular phone and a laptop. FIGS. 2C and 2D show example embodiments of acoustic communications between a wearable device and a laptop. FIGS. 2A and 2B illustrate physical examples of the theoretical model presented in FIGS. 1A and 1B using example currently available computing devices.

Figure 3A:
FIGS. 3A and 3B are visual representations of acoustic communications between a cellular phone/wearable device and an access control panel/protected source such as an ATM, vending machine, automobile, etc.
Figure 3B:

FIGS. 3A and 3B show example embodiments of acoustic communications between a wearable device and an example access control panel. FIGS. 3A and 3B illustrate physical examples of the theoretical model presented in FIGS. 1A and 1B using example currently available computing devices.

Figure 4A:
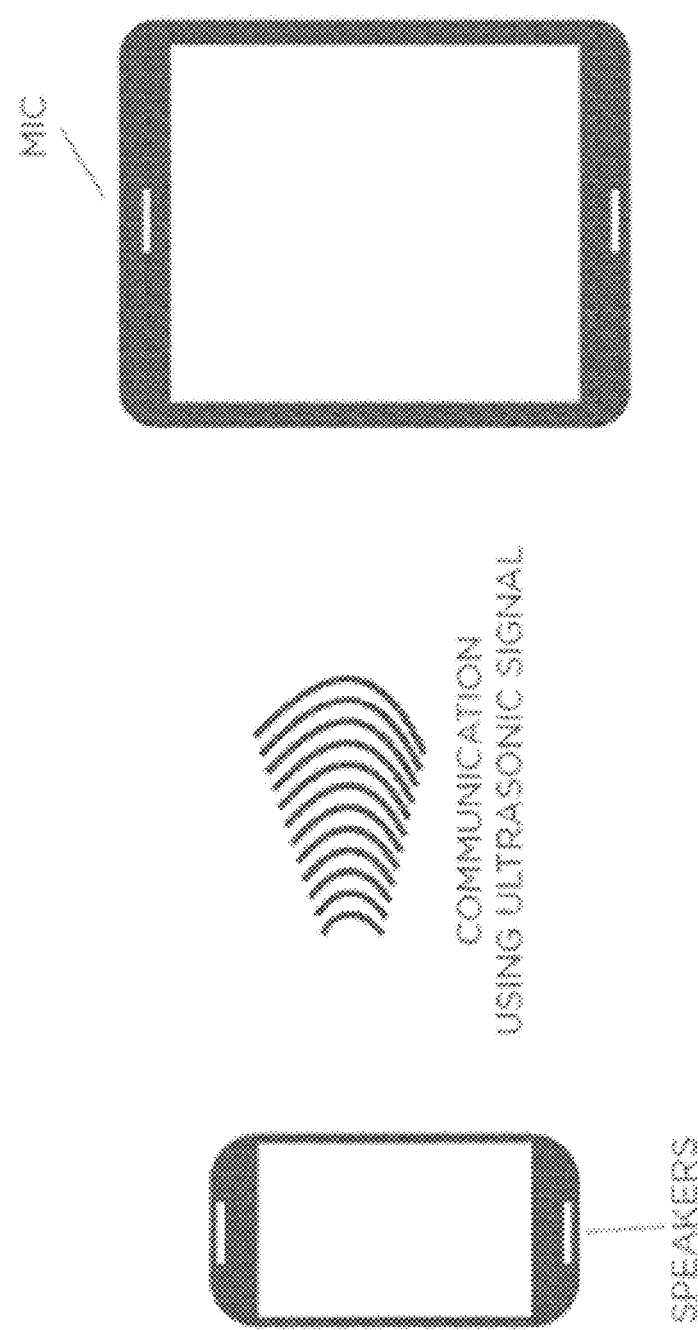
FIGS. 4A and 4B are visual representations of acoustic communications between a cellular phone/wearable device and a tablet computer.
Figure 4B:
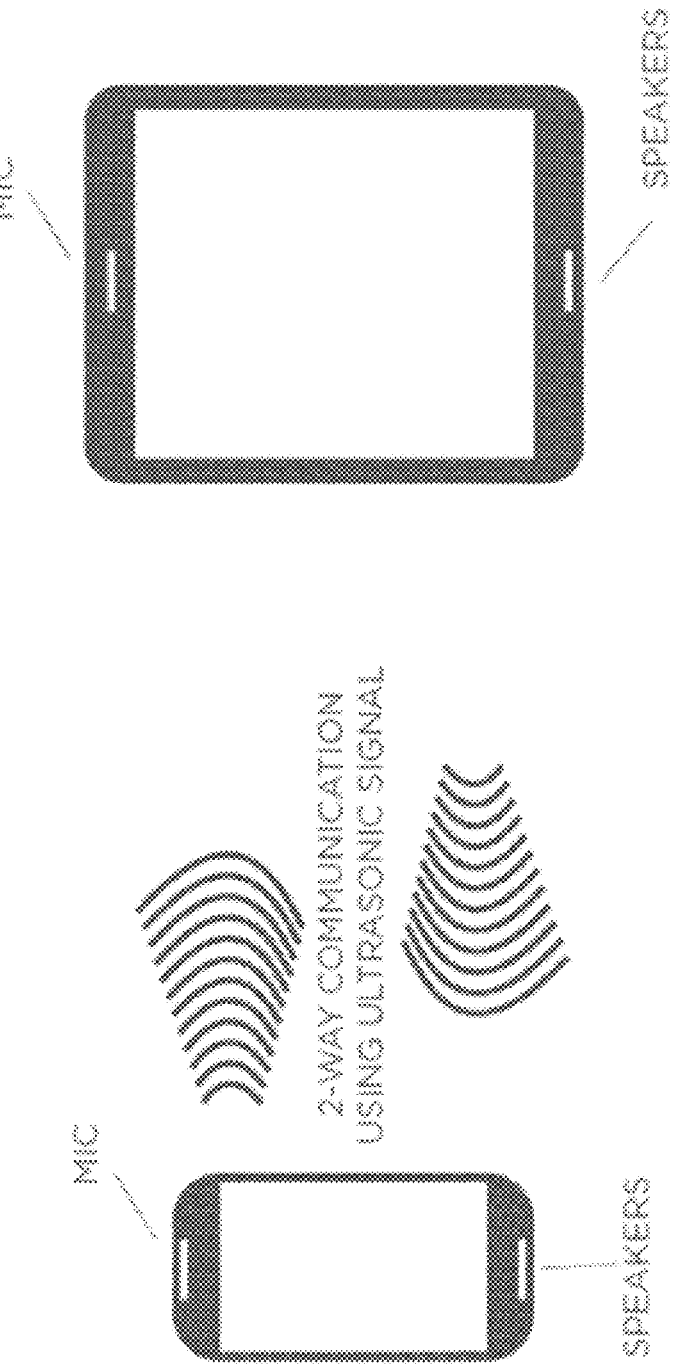

FIGS. 4A and 4B show example embodiments of acoustic communications between a cellular phone and a tablet computer. FIGS. 4A and 4B illustrate physical examples of the theoretical model presented in FIGS. 1A and 1B using example currently available computing devices.

In particular embodiments, the first computing device A, second computing device B, or a combination of first computing device A and second computing device B (and similarly, third computing device C, fourth computing device D, or a combination of third computing device C and fourth computing device D) may comprise a transmitter and a receiver. The transmitter may encode data and generate acoustic signals with data as payload. The receiver may listen for acoustic signals and extract payload, and then use the data for a task. As an example and not by way of limitation, first computing device A may comprise a transmitter and second computing device B may comprise a receiver.

In particular embodiments, the transmitter may comprise instructions for providing a user interface ("UI") that allows a user to enter information that is used to provide access to a secured resource (e.g., secured data). The user may retrieve this information from third party service providers (e.g., Google) in the form of a username and secret token. As an example and not by way of limitation, the token may be used as the seed for a time-based one-time password (TOTP) generation algorithm. The secret token may be stored on the device running the transmitter software (e.g., a smartphone) using secure storage provided by the device's operating system.

In particular embodiments, the transmitter may provide a UI that allows the user to select a service and transmit a one-time code. The one-time code (e.g., a secret number) may be read from secure storage and used to generate an access code using instructions that run on the local device (e.g., instructions that run entirely on the local device, instructions that run on a separate server, instructions that run on a separate external device). In particular embodiments, the one-time code and current time may be used as input to a library that generated TOTP codes. In particular embodiments, the code may then be added to a formatted message and transmitted using an audio output device (e.g., which may be internal or external).

In particular embodiments, the message sent by the transmitter may comprise a fixed alphabet in additional to special control characters. As an example and not by way of limitation, the message may include the characters below and their corresponding purposes:

| Character | Purpose |
|---|---|
| {S} | start of message |
| {E} | end of message |
| {D} | duplicate character separator |

In particular embodiments, additional information may be encoded with the instructions, the length of the instructions, and an XOR checksum. As an example and not by way of limitation, the encoding messaging may have the format: message=[start control character][code length]code[checksum][end control char]
In particular embodiments, Consecutive duplicate characters are separated by a duplicate character separator ({D}). For example, instructions (e.g., code) that reads "112233" may be encoded as "1{D}12{D}23{D}3". In particular embodiments, the checksum may be a XOR checksum. In particular embodiments, the final checksum may undergo a bitwise AND operation with 63 Hex so that it will fit into two numeric decimal characters, and preceding zeros are included in the checksum (e.g., when checksum=1, encoded checksum=01).

In particular embodiments, an additional encryption stage may be applied to the formatted message. The encryption algorithm can be varied based on deployment requirements.

In particular embodiments, the acoustic signal may be encoded using a Single Tone Multi Frequency algorithm. As an example and not by way of limitation, a fixed alphabet may be defined that includes the characters used to define codes plus control characters to identify the start and end of the message and to separate duplicate characters. As an example and not by way of limitation, each transmittable character is assigned a frequency within a predefined frequency range, as shown below:

| Character | Frequency kHz |
|---|---|
| {S} (start of message control character) | 19 |
| 0 | 19.1 |
| 1 | 19.2 |
| 2 | 19.3 |
| 3 | 19.4 |
| 4 | 19.6 |
| 6 | 19.6 |
| 6 | 19.7 |
| 7 | 19.8 |
| 8 | 19.9 |
| 9 | 20.0 |
| {D} (separates duplicate characters) | 20.1 |
| {E} (end of message control character) | 20.2 |

In particular embodiments, the formatted message is transmitted in a serial manner (one character at a time). As an example and not by way of limitation, a sine wave with the frequency corresponding to the current character may be generated for a predetermined length of time. The length of the pulse may be configured by the transmitting software. Once a character pulse has been output for the correct amount of time the next character in the message may be sent until all data has been sent. As an example and not by way of limitation, for the code 123466, the message for this code will be {S}61234663{D}3{E}, as shown below:

| Time | Character | Frequency kHz |
|---|---|---|
| 0 | {S} | 19.0 |
| 0.1 | 6 | 19.7 |
| 0.2 | 1 | 19.2 |
| 0.3 | 2 | 19.3 |
| 0.4 | 3 | 19.4 |
| 0.6 | 4 | 19.6 |
| 0.6 | 6 | 19.6 |
| 0.7 | 6 | 19.7 |
| 0.8 | 3 | 19.4 |
| 0.9 | {D} | 20.1 |
| 1.0 | 3 | 19.4 |
| 1.1 | {E} | 20.2 |

In particular embodiments, the software may be configured to send the message multiple times. In particular embodiments, the software may provide a mechanism for client software and users to control the output volume. In particular embodiments, the software may provide a mechanism for controlling ramp up and ramp down behavior for the pulses and for inserting periods of silence between pulses. In particular embodiments, the sound pulses may be generated at runtime or be pre-rendered audio data (files).

In particular embodiments, the receiver may be responsible for detecting the acoustic signal, decoding the data (e.g., by a decoder), and performing an action. In particular embodiments, the receiver may use the same fixed alphabet, control characters and frequency range.

In particular embodiments, the receiver software may request access to the system microphone on a system or device either in response to user input (e.g., the user clicks a button), or automatically by detecting situations in which it should listen (e.g., a web browser opening a particular web link URL). In particular embodiments, the receiver software may be a standalone executable software, an add on for existing software (e.g., a browser plugin), or any other suitable software. In particular embodiments, upon activation the receiver may continuously read input from a microphone attached to a host device.

In particular embodiments, the decoder may be responsible for detecting frequency peaks at the frequencies corresponding to the characters sent by the transmitter. In particular embodiments, the receiver may convert sampled audio data from the OS into the frequency domain. The algorithm used for performing this transformation may be a fast Fourier transform, other time-to-frequency domain conversion algorithms, or other suitable algorithms, to optimize performance for specific situations. In particular embodiments, the receiver continuously checks the received data for peaks at any of the frequencies that match the characters sent by the transmitter. A configurable frequency error range ("FERR") may be allowed such that a peak within FERR of one of the predefined frequencies is considered a match. In particular embodiments, the value of FERR may be configurable. As an example and not by way of limitation, the peaks with the largest magnitude may be found and their magnitudes compared to a configurable threshold value. In particular embodiments, if the magnitude is large enough the peak may be added to a history. As an example and not by way of limitation, to be considered a peak that represents a character a frequency peak must have been present for a certain number of iterations. The number of iterations may be configurable. The peak may now be considered to be "valid."

In particular embodiments, once a "valid" peak has been detected, the receiver may convert the peak to the "alphabet domain." If the peak represents a character in the alphabet, serial decoding of the message begins.

In particular embodiments, the message may be contained between start and end control signals (e.g., {S} and {E}, respectively). In particular embodiments, the receiver may have two states: an idle state (e.g., waiting for a start control character), and a working state (e.g., reading data, waiting for end character). Upon detecting the start character, the receiver may switch to the working mode and may read consecutive peaks and add them to a message buffer. If no peaks are detected within a configurable timeout period the receiver may return to the idle state.

In particular embodiments, when the receiver detects the end character, the receiver may start performing error checking on the message by checking that the length of the data matches the message, and/or checking that the transmitted checksum matches a locally calculated checksum. If both conditions are satisfied, the data may be passed to software that can use the data. As an example and not by way of limitation, the receiver may use the data to populate a field in a web page.

Figure 5A:
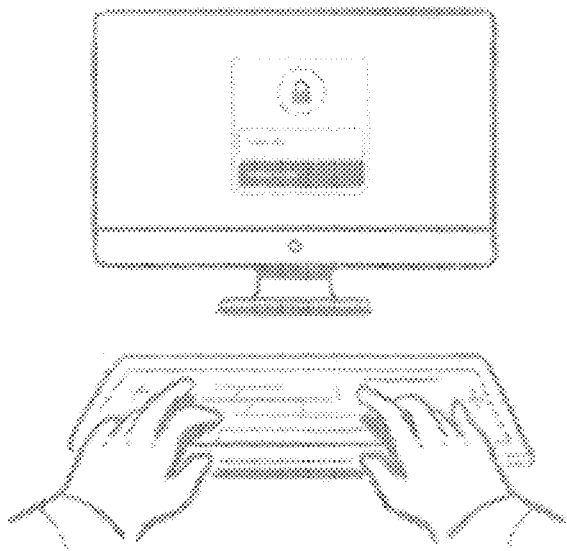
FIGS. 5A-5E illustrate an example authentication process according to a particular embodiment.
Figure 5B:
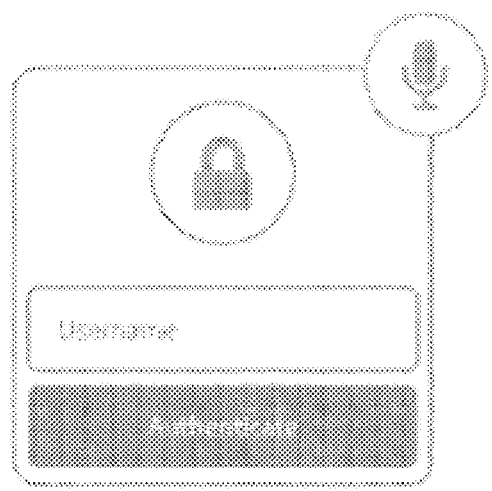
Figure 5C:
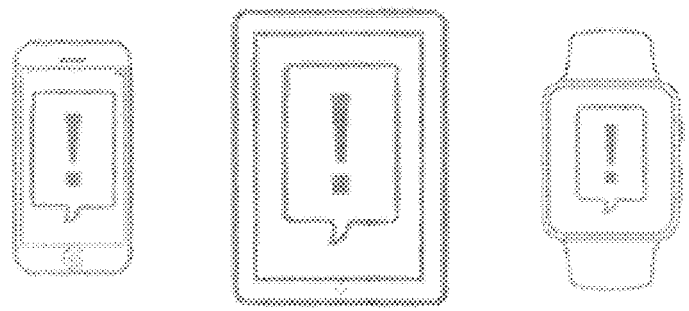
Figure 5D:
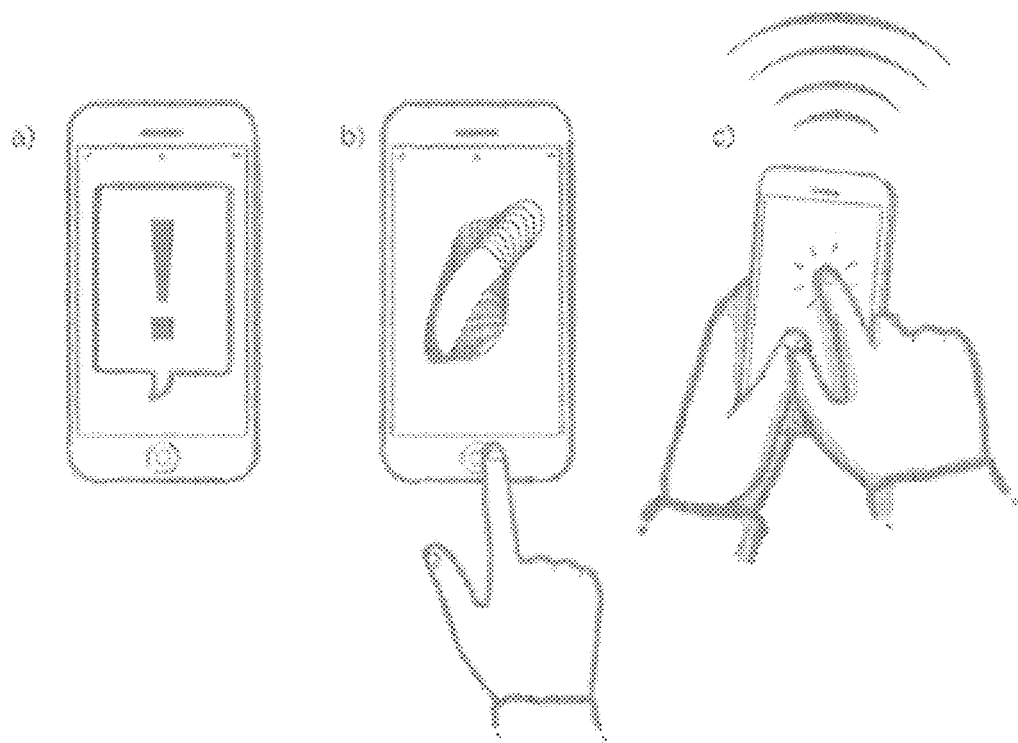
Figure 5E:
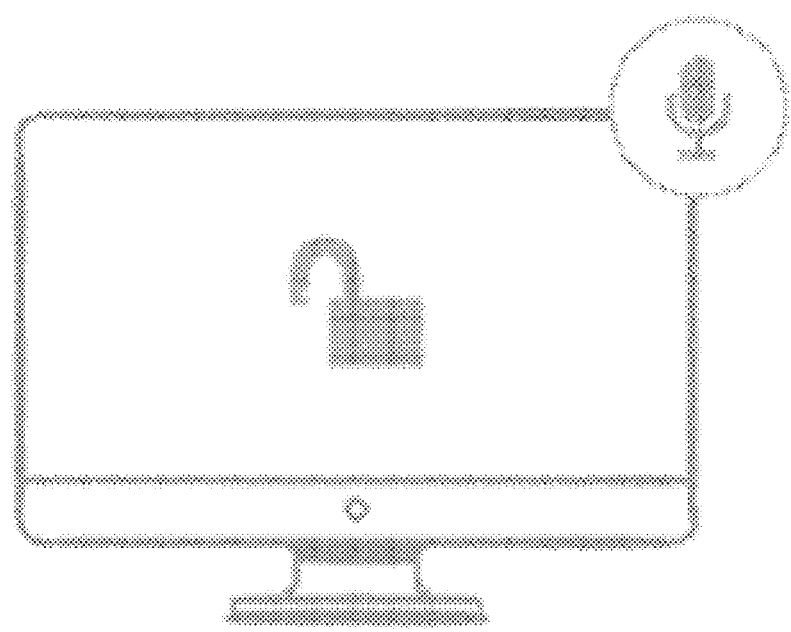

FIGS. 5A-5E illustrate an example authentication process according to a particular embodiment. As shown in FIG. 5A, the user may attempt to access a website on a computer that is equipped with a microphone. As shown in FIG. 5B, the user may type in a username, and then may click on an "authenticate" button. Then, computer "listens" for the inputted username and user-requested authentication (e.g., by a browser plugin) or initiates the device audio input to listen for the inputted username and user-requested authentication. As shown in FIG. 5C, the website may notify the user's mobile device or wearable device using a push notification. As shown in FIG. 5D, the user may activate a corresponding program on the mobile device which then sends authentication information via the authentication process to the device that is asking for the authentication information by (a) receiving a push notification, (b) activating the authentication process via biometrics on any mobile device or on a wearable device with a biometric sensor, and (c) the user authenticating the website's request for user authenticity. As shown in FIG. 5E, the website or device that the user is trying to access may then accept the authentication and allow user to pass through.

Synchronization is one method by which ambient or other non-informational signal interference can be highly attenuated. Synchronization of signals requires that the receiver and transmitter are, within a certain tolerance, in phase. The phase detection method is sensitive to the phase of a given signal and by extension, the frequency of the signal and the frequency expected at the receiver. This is true since two differing frequencies, the one transmitted and the one expected by the receiver will not be in sync, except for very brief and widely separated time intervals.

Figure 6:
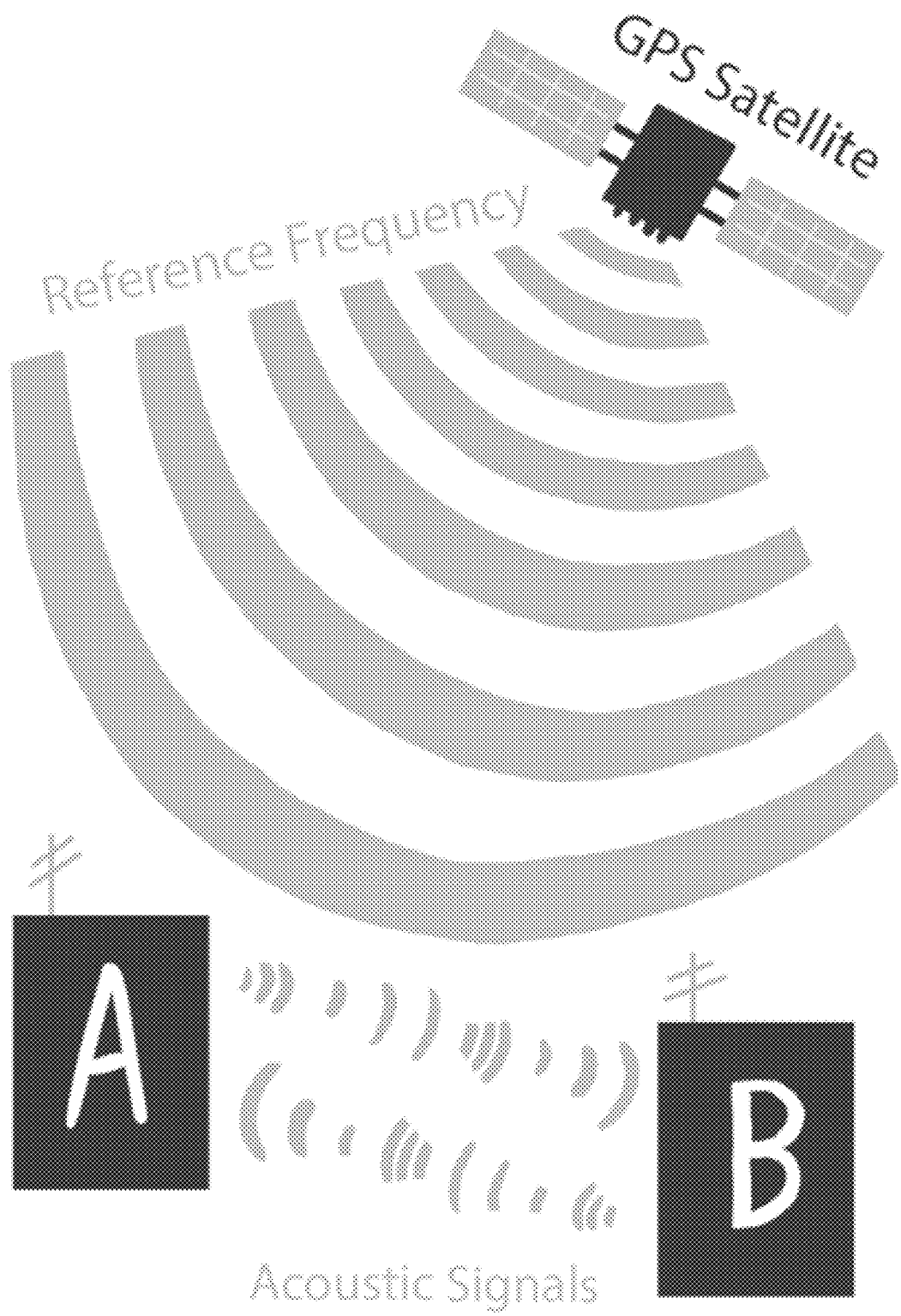
FIG. 6 illustrates collection of reference signals by two example devices.

FIG. 6 illustrates how the receiver (A) and transmitter (B) collect their reference signal according to particular embodiments. Groups of GPS satellites, in concert may generate and transmit signals of reference frequencies. The GPS satellite group may use each of their individual atomic clocks to form an average standard reference frequency. One of these signals is an exquisitely accurate 1 Hz time tick. In particular embodiments, most communications devices may be able to receive this reference signal.

Figure 7:
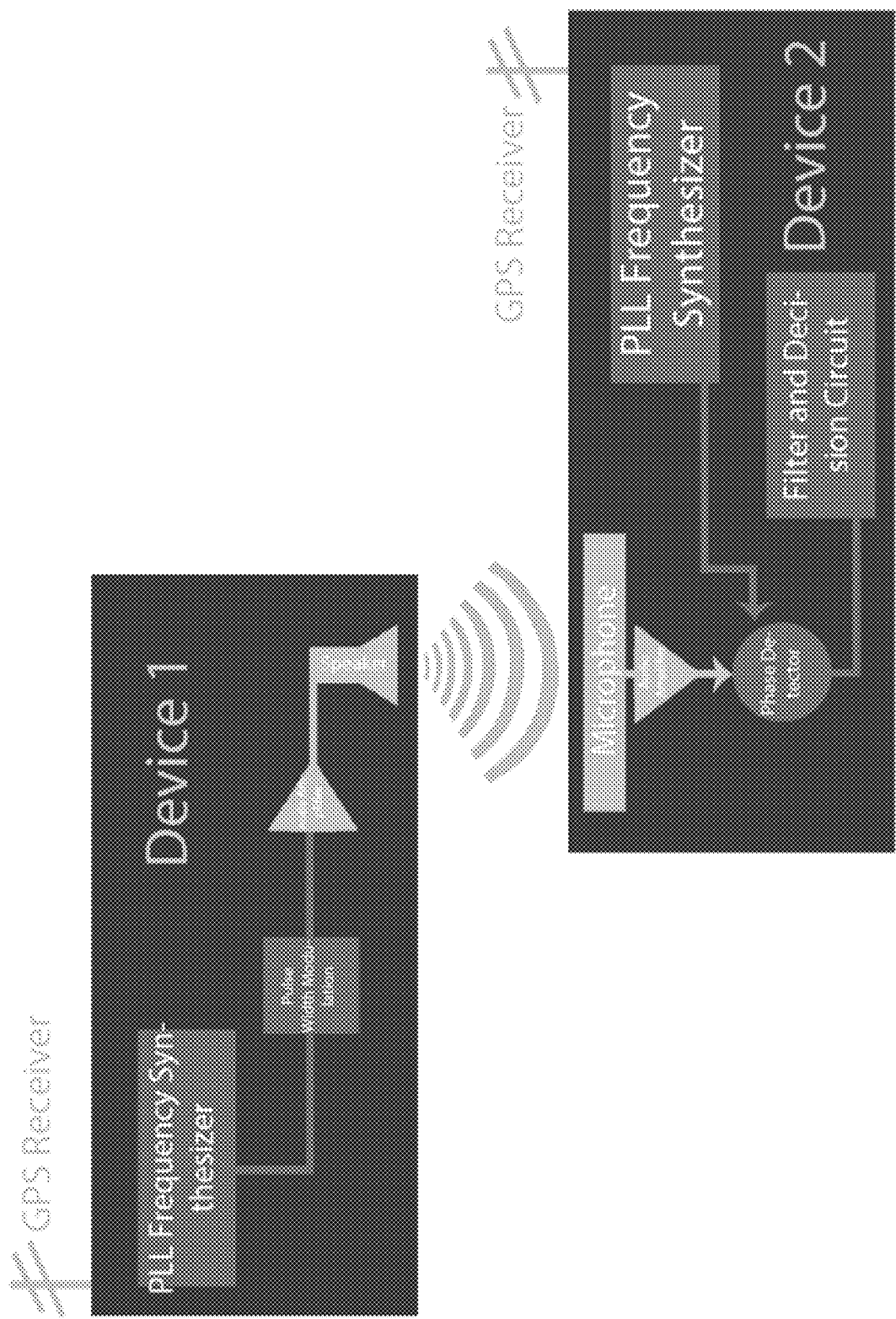
FIG. 7 illustrates an example method of synchronization between two devices.

FIG. 7 illustrates an example basic synchronization process. Both communications Device 1 and Device 2 may utilize the 1 Hz reference signal as one of the phase comparator inputs to a phase-locked loop ("PLL"). The output of the PLL is digitally divided by the value of the reference frequency of interest. For example, if the reference frequency is to be 1000 Hz, the output of the PLL is divided by 1000. The output of the divider may be used as the second comparator input of the PLL. The output of the PLL before the divider is 1000 Hz since it is the product of the divisor and the first reference signal (e.g., 1 Hz). Since the PLL forces the two comparator inputs to remain in phase, the 1000 Hz reference frequency is locked in phase and frequency to the programmed multiple of the GPS satellite's 1 Hz reference. It is similar to a discriminator or ratio detector used in frequency demodulation or it could be a digital device, like an 'Exclusive OR' gate.

The receiver and transmitter may be much closer to one another than to the satellite. Therefore the skew in arrival time, from the satellite to the two communication devices is essentially non-existent. This behavior assures that the communication devices receive the 1 Hz signal at the same time causing them to be synchronously (e.g., in time) locked with one another. Tone bursts and reference tones can be generated and detected at a specific frequency, phase and time by carrying out the predicate operations synchronously. In this regard the communication channel between devices operates as if a high-Q filter was interposed the receiver's detector and decoder. This effectively creates a virtual private channel between the communication devices. Any spurious signal, such as one generated environmentally, may be effectively ignored by the communication devices since it is uncorrelated with the synchronous channel properties. This ensures transmission and detection of only informational signals, since the probability of the spurious signal containing a perfectly synchronized signal may be extremely low. In particular embodiments, pulse width modulation and audio amplification may be handled by the native operating systems of the respective devices.

Figure 8:
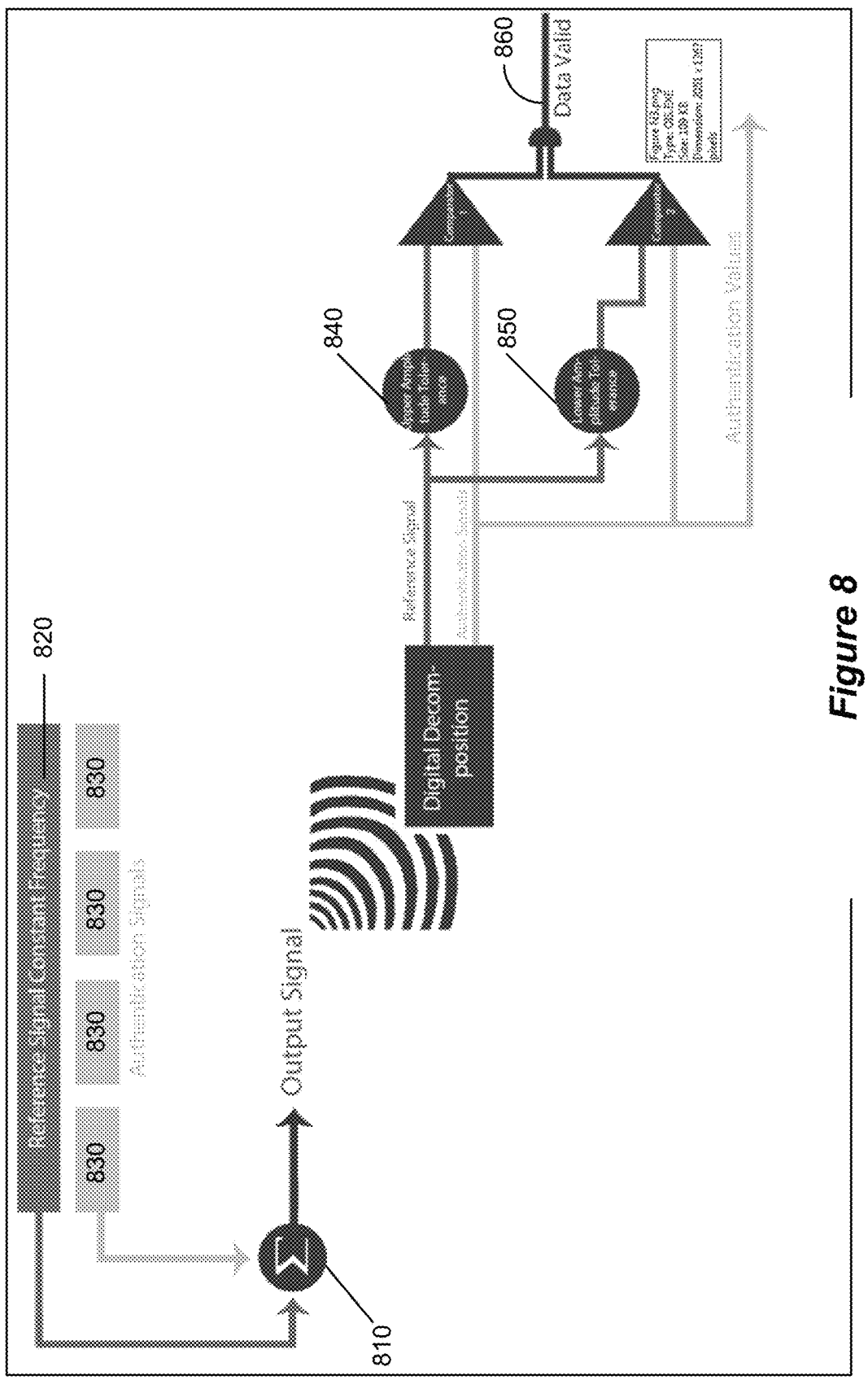
FIG. 8 illustrates an example method of transmitting and receiving authentication signals along with a reference signal.

FIG. 8 illustrates an example method of transmitting and receiving authentication signals along with a reference signal. The assembled or summed output signal 810 to be transmitted may be the algebraic sum of a constant reference signal of a pre-selected frequency 820 and the authentication signals 830 that represent particular characters or numerical values. This summed signal 810 may be processed by the audio processor of the communication device and emitted by its speaker.

A microphone in the receiver communication device detects the signal 810, upon which the receiver communication device performs a digital decomposition in order to convert it into an electronic representation. The receiver may perform the digital decomposition by mathematically decomposing or detecting the contained frequencies and their amplitudes. The signal amplitude may be compared to an amplitude window. This amplitude window is defined by the amplitude of the reference signal adjusted for an upper tolerance limit 840 and lower tolerance limit 850 to compensate for variability in the reference signal and the authentication-signal bursts. The receiver communication device then transmits a signal 860 if the amplitude window has been satisfied. The software then checks if the frequency of the authentication signals are ones that the system recognizes. If not, the authentication signals are ignored. If so, the system further processes the mapping of the authentication signals' frequencies onto character or numerical values and responds accordingly.

This method increases the selectivity of the data exchange by several means. The method requires proper frequency, burst-duration and amplitude values to register the value as a valid authentication signal defined value or character. Each of the events in probability space, for a random external process, is linearly independent. This dictates that the probability that random processes will generate a spurious signal, identified as valid by the system, is the product of the probabilities of occurrence of each of the aforementioned values. In the off-chance that a random process is detected as a valid authentication signal, the probability of it being a valid authentication signal in the context of the full authentication signal string is small. This would cause a retransmit request, which would further reduce the compound error probability of the overall process.

Figure 9:
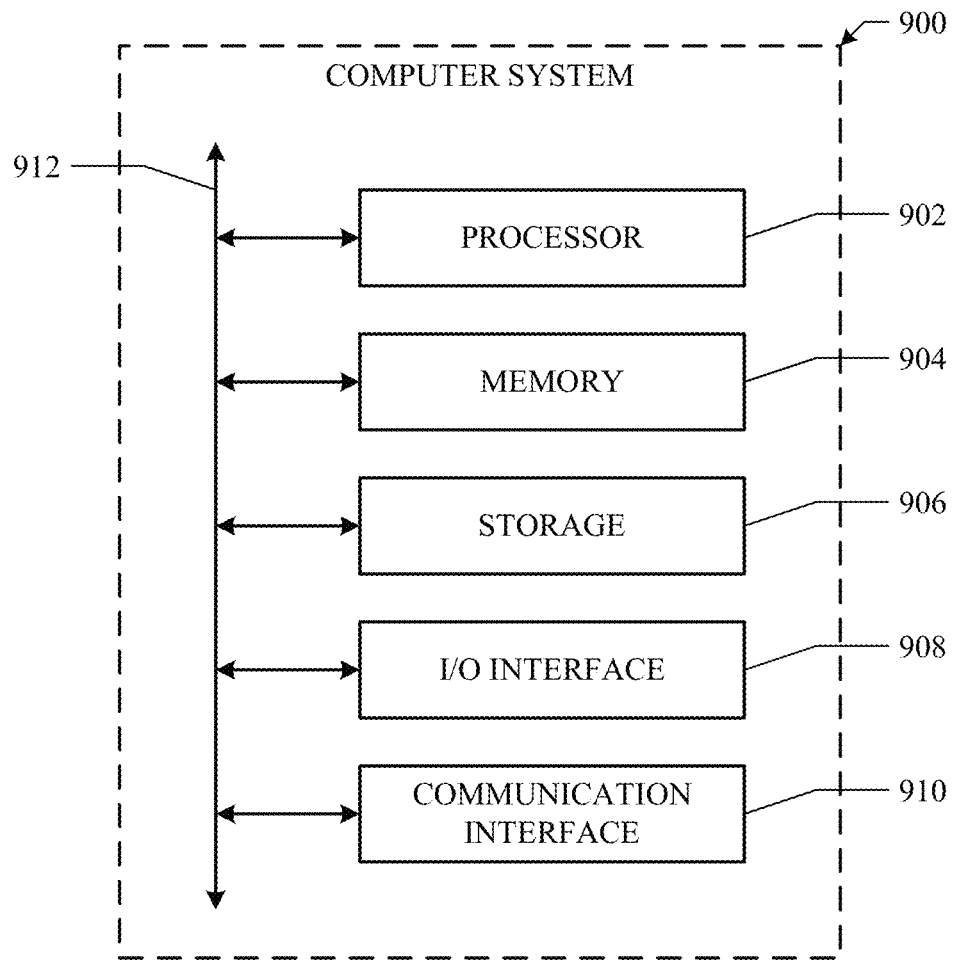
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for transmitting authentication data using acoustical means, comprising:
    encoding, by a first device, information into an acoustic signal;
    emitting, by an audio output component of the first device, the acoustic signal at an ultrasonic frequency greater than or equal to 20 kHz;
    detecting, by an audio input component of a second device listening for acoustic signals at an ultrasonic frequency greater than or equal to 20 kHz, the acoustic signal, wherein the detecting comprises filtering out ambient noise; and
    decoding, by the second device, the acoustic signal into one or more pieces of information.

2. The method of claim 1, wherein the information is encoded into the acoustic signal using a Single Tone Multi Frequency algorithm.

3. The method of claim 2, wherein the information includes a message comprised of a plurality of characters, and wherein each transmittable character is assigned a frequency within a predefined frequency range.

4. The method of claim 3, wherein the emitting the acoustic signal comprises:
    for each of the characters, generating a sine wave having a frequency corresponding to the character, wherein a length of a pulse of the sine wave is configured to be a predetermined length of time.

5. The method of claim 1, wherein the filtering out ambient noise comprises:
    decomposing a reference signal sent by the first device to the second device together with the acoustic signal, wherein synchronized reference signals were sent to the first device and the second device; and
    verifying the reference signal sent by the first device with respect to the reference signal sent to the second device.

6. One or more computer-readable non-transitory storage media embodying software for transmitting authentication data using acoustical means that is operable when executed to:
    encode, by a first device, information into an acoustic signal;
    emit, by an audio output component of the first device, the acoustic signal at an ultrasonic frequency greater than or equal to 20 kHz;
    detect, by an audio input component of a second device listening for acoustic signals at an ultrasonic frequency greater than or equal to 20 kHz, the acoustic signal, wherein the detecting comprises filtering out ambient noise; and
    decode, by the second device, the acoustic signal into one or more pieces of information.

7. The computer-readable non-transitory storage media of claim 6, wherein the information is encoded into the acoustic signal using a Single Tone Multi Frequency algorithm.

8. The computer-readable non-transitory storage media of claim 7, wherein the information includes a message comprised of a plurality of characters, and wherein each transmittable character is assigned a frequency within a predefined frequency range.

9. The computer-readable non-transitory storage media of claim 8, wherein the software that is operable when executed to emit the acoustic signal is further operable to:
    for each of the characters, generate a sine wave having a frequency corresponding to the character, wherein a length of a pulse of the sine wave is configured to be a predetermined length of time.

10. The computer-readable non-transitory storage media of claim 6, wherein the software that is operable when executed to filter out ambient noise is further operable to:
    decompose a reference signal sent by the first device to the second device together with the acoustic signal, wherein synchronized reference signals were sent to the first device and the second device; and
    verify the reference signal sent by the first device with respect to the reference signal sent to the second device.

11. A system comprising:
    one or more processors; and
    one or more computer-readable non-transitory storage media coupled to one or more of the processors and comprising instructions operable when executed by one or more of the processors to cause the system to:

encode, by a first device, information into an acoustic signal;

emit, by an audio output component of the first device, the acoustic signal at an ultrasonic frequency greater than or equal to 20 kHz;

detect, by an audio input component of a second device listening for acoustic signals at an ultrasonic frequency greater than or equal to 20 kHz, the acoustic signal, wherein the detecting comprises filtering out ambient noise; and decode, by the second device, the acoustic signal into one or more pieces of information.

12. The system of claim 11, wherein the information is encoded into the acoustic signal using a Single Tone Multi Frequency algorithm.

13. The system of claim 12, wherein the information includes a message comprised of a plurality of characters, and wherein each transmittable character is assigned a frequency within a predefined frequency range.

14. The system of claim 13, wherein the instructions operable when executed by one or more of the processors to cause the system to emit the acoustic signal are further operable to:

for each of the characters, generate a sine wave having a frequency corresponding to the character, wherein a length of a pulse of the sine wave is configured to be a predetermined length of time.

15. The system of claim 11, wherein the instructions operable when executed by one or more of the processors to cause the system to filter out ambient noise are further operable to:

decompose a reference signal sent by the first device to the second device together with the acoustic signal, wherein synchronized reference signals were sent to the first device and the second device; and verify the reference signal sent by the first device with respect to the reference signal sent to the second device.

* * * * *